United States Patent [19]

Karp et al.

[11] Patent Number: 5,188,205
[45] Date of Patent: Feb. 23, 1993

[54] ONE WAY CLUTCH

[76] Inventors: Stefan Karp, 37 Glenfield Rd., Luton, Beds, England, LU3 2HZ; Stuart C. Burgess, Flat 34, Refectory Hall, Runnymede Campus, Coopers Hill, Egham, Surrey, England, TW20 0JZ

[21] Appl. No.: 635,583
[22] PCT Filed: Jun. 13, 1989
[86] PCT No.: PCT/GB89/00661
  § 371 Date: Jan. 28, 1991
  § 102(e) Date: Jan. 28, 1991
[87] PCT Pub. No.: WO90/00688
  PCT Pub. Date: Jan. 25, 1990

[30] Foreign Application Priority Data

Jul. 5, 1988 [GB] United Kingdom ............... 8815929

[51] Int. Cl.$^5$ .............................................. F16D 41/32
[52] U.S. Cl. ............................................ 192/46; 192/64
[58] Field of Search ....................................... 192/46, 64

[56] References Cited

U.S. PATENT DOCUMENTS

| 2,551,000 | 5/1951 | Horton | 192/46 |
| 3,928,862 | 12/1975 | Ivester et al. | 354/86 |
| 4,164,130 | 8/1979 | Hammer | 68/133 |
| 5,020,648 | 6/1991 | Bush et al. | 192/46 |

FOREIGN PATENT DOCUMENTS

| 131679 | 3/1984 | European Pat. Off. | |
| 1051146 | 2/1959 | Fed. Rep. of Germany | |
| 1089648 | 3/1955 | France | |
| 1195874 | 11/1959 | France | |
| 2375005 | 7/1978 | France | |
| 1275160 | 12/1986 | U.S.S.R. | 192/46 |
| 409439 | 5/1934 | United Kingdom | |
| 567312 | 2/1945 | United Kingdom | |
| 2174464 | 11/1986 | United Kingdom | |

Primary Examiner—Richard Lorence
Attorney, Agent, or Firm—Harrison & Egbert

[57] ABSTRACT

A one way clutch comprises an inner clutch member (12) and an outer clutch member (10). The outer clutch member carries a set of ratchet teeth (18) and the inner clutch member carries two sets of sloping faced projections (20, 22) around its periphery. An arcuate resiliently flexible member (14) is arranged between the inner and outer clutch members and has a set of ratchet teeth (26) engageable with the outer member ratchet teeth and a set of sloping faced projections (37) at intervals along its length. A tail end of the member carries a pawl (32). On relative rotation of the inner and outer members in a non-driving direction, the pawl ratchets over the outer clutch member ratchet teeth. On relative rotation in a driving direction, the pawl engages a ratchet tooth and the projections on the intermediate member abut and ride up the faces of those on the inner clutch member to flex the intermediate member outwardly until the sets of ratchet teeth on the intermediate and outer clutch members engage one another to transmit driving torque.

6 Claims, 4 Drawing Sheets

ONE WAY CLUTCH

This invention relates to one way clutches, for example for use as bicycle freewheel mechanisms.

According to the invention, there is provided a one way clutch, comprising coaxial first and second rotatable clutch members and an arcuate resiliently flexible intermediate member arranged between the clutch members, the first clutch member having a set of ratchet teeth and the intermediate member and second clutch member having means for preventing substantial relative rotation between the intermediate and second clutch members, characterized in that the intermediate member has a set of ratchet teeth engageable with the first member ratchet teeth and a set of sloping faced projections at intervals along the intermediate member, in that the intermediate member carries a pawl at one end and in that the second clutch member has a set of sloping faced projections at intervals around the member engageable with those of the intermediate member, the arrangement being such that on relative rotation of the clutch members in a non-driving direction, the pawl ratchets over the ratchet teeth of the first member but on relative rotation in the driving direction, the pawl engages a ratchet tooth of the first member and the projections on the intermediate member abut and ride up the faces of those of the second member clutch member to flex the intermediate member towards the first clutch member until the sets of ratchet teeth on the intermediate and first members engage one another to transmit driving torque.

With this construction, the intermediate member and, if desired, the other clutch members, can be molded from appropriate plastics material. Assembly of the clutch is particularly simple since it does not involve the handling of separate pawls and pawl springs.

The provision of projections around the intermediate member and the second clutch member has the advantage that the intermediate member flexes substantially uniformly into engagement with the first clutch member and the driving forces are distributed among the projections.

The advantage is even greater in the preferred embodiment of the invention in which the second clutch member is provided with two sets of projections on opposite sides of the intermediate member. The intermediate member is received between the two sets and the projections on the intermediate member are formed by lateral extensions of the intermediate members and may be aligned with the ratchet teeth.

The invention will now be described in more detail by way of example, with reference to the drawings, in which.

Figure 1:
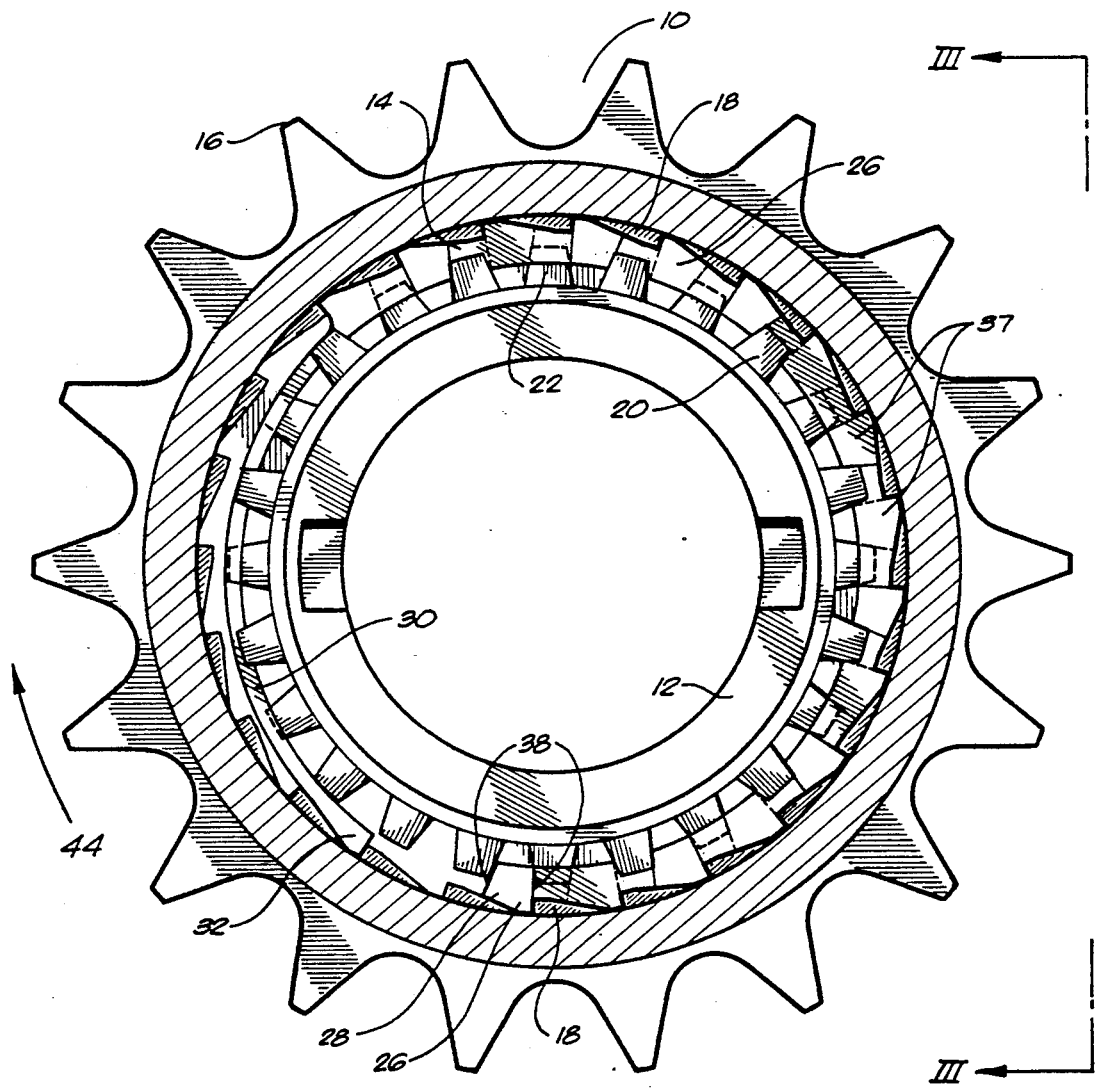
FIG. 1 is a front sectional view on the line I—I in FIG. 3 of a one way clutch embodying the invention in the driving position.
Figure 2:
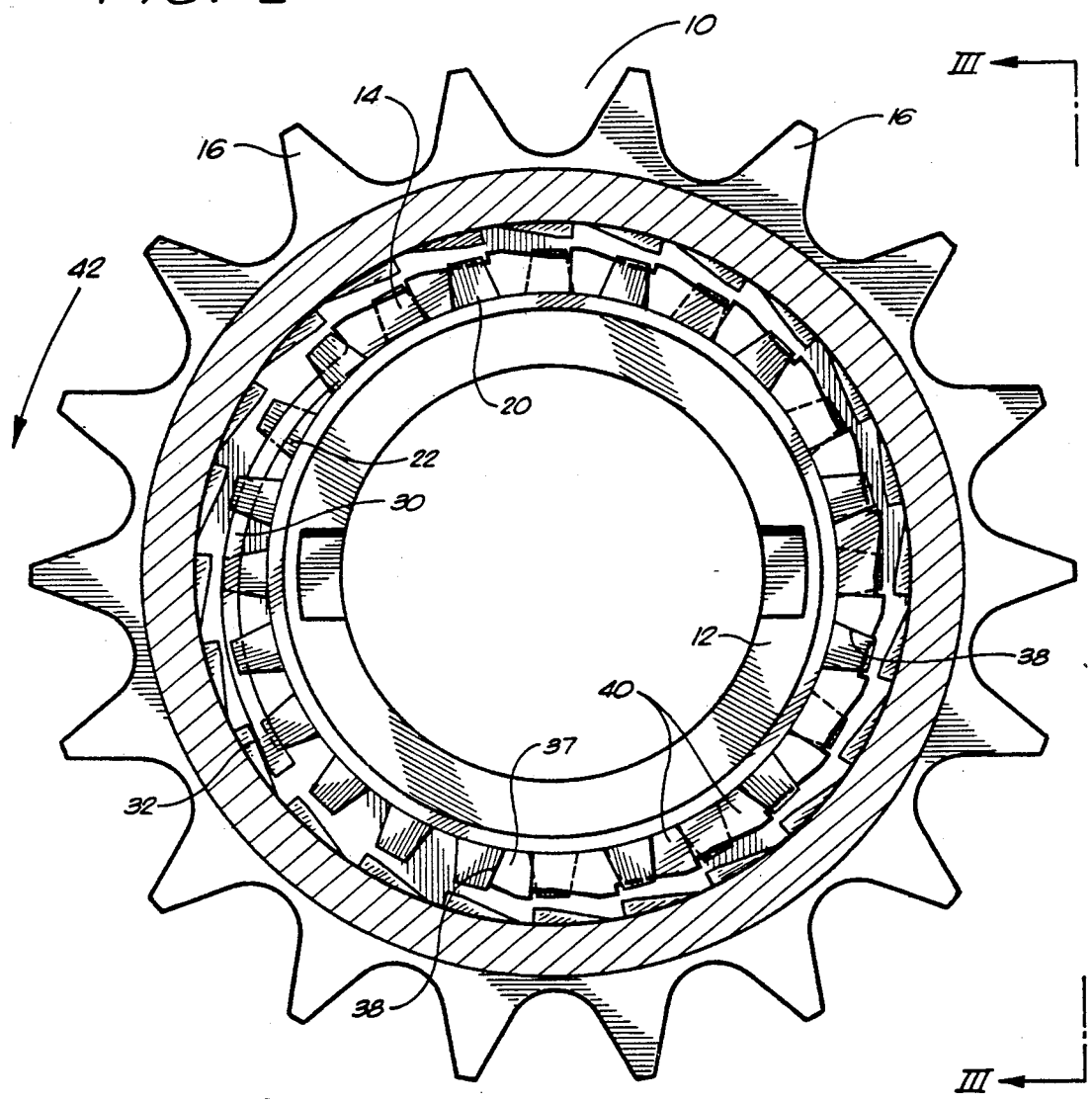
FIG. 2 is a similar view to FIG. 1 in the disengaged position.
Figure 3:
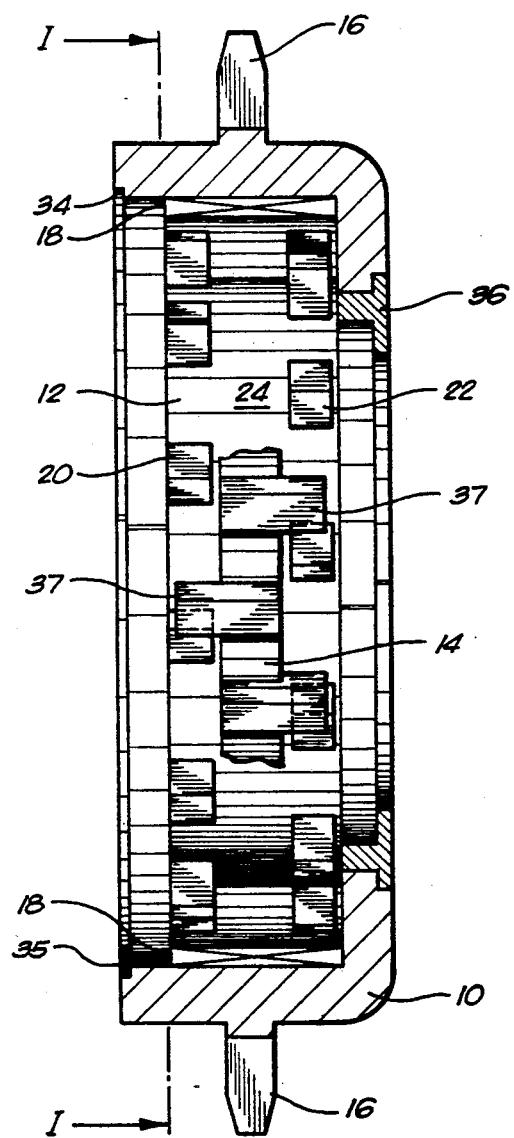
FIG. 3 is a view along the line III—III in FIGS. 1 and 2 of the inner clutch member within a sectional view of the outer clutch member.
Figure 4:
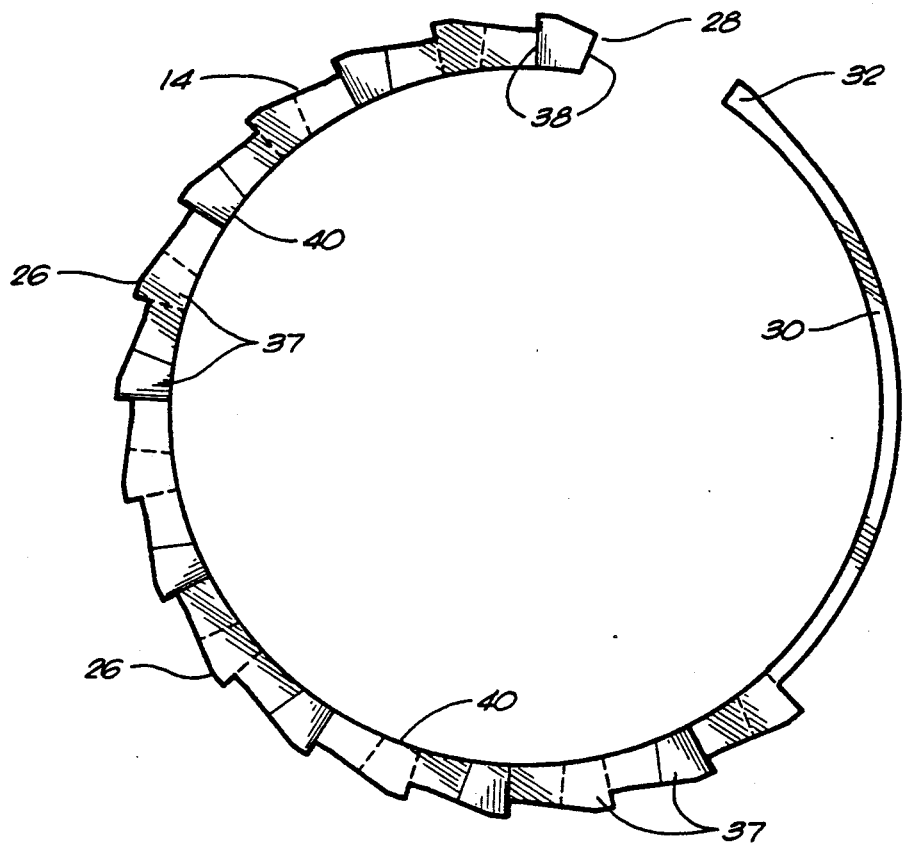
FIG. 4 is a front view of the intermediate member of the embodiment of FIG. 1.
Figure 5:
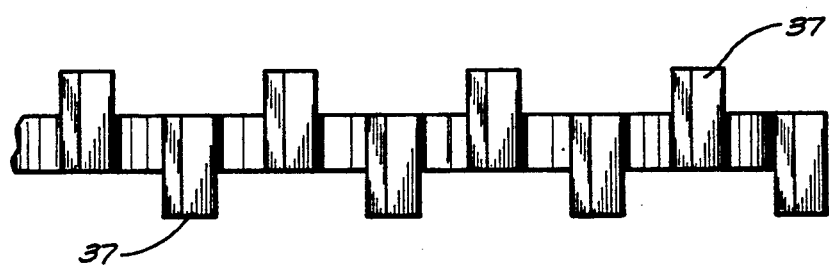
FIG. 5 is a scrap plan view of the member of FIG. 4 laid flat.

The clutch shown in FIGS. 1 to 5 comprises three members: an outer clutch member 10, an inner clutch member 12 and an intermediate member 14.

The outer clutch member 10 carries a set of external sprocket teeth 16 of the type normally used on a bicycle freewheel. It also carries a ring of ratchet-type internal clutch teeth 18.

The inner clutch member 12 is mounted coaxially within the outer clutch member 10 so that the two clutch members 10 and 12 define an annular space therebetween and are relatively rotatable. The inner clutch member carries two sets of radially projecting lugs 20 and 22 on its outer surface. These lugs are spaced apart from one another to define a channel 24 (FIG. 3) in which the intermediate member is seated. The two sets of lugs 20 and 22 are circumferentially offset with respect to one another by half the pitch of the lugs. The lugs are generally trapezoidal in elevation. As can be seen from FIG. 3, the width of the clutch teeth 18 of the outer clutch member is equal to the width of the raised periphery of the inner clutch member. The number of lugs on the inner clutch member is equal to the number of clutch teeth on the outer clutch member 10.

The intermediate member 14 is arcuate and resiliently flexible, being conveniently molded from appropriate plastics material, and is located within the annular space in the channel 24 on the inner clutch member. The intermediate member is formed with a set of clutch teeth 26 on its outer circumference, having the same pitch and slope as the clutch teeth 18 on the outer member. These clutch teeth 26 extend upto a front end 28 of the intermediate member 14. The opposite rear end of the intermediate member terminates in an unsoothed tail portion 30 which has a pawl 32 on its outer surface. The tail portion 30 forms a leaf spring urging the pawl, which is wedge shaped, into contact with the outer clutch member. The intermediate member is retained captive between inner and outer clutch members by the lugs 20 and 22 and the inner member is held in position by a flange 35 on the inner clutch member which sits in an annular groove 34 on the one side of the outer member and an annular sealing flange 36 on the other side of the outer member which forms an interference fit with the inner clutch member 12. Both flanges prevent the ingress of dirt.

The intermediate member 14 is provided with a series of lateral extensions 37, one extending from each tooth in a staggered pattern on alternate sides of the intermediate member. The outer surface of each extension is a continuation of the ramped clutch teeth 26 and the side walls 38 and inner surface 40 of the extensions have the inverted profile of the lugs of the inner clutch member. Thus, the side walls slope inward. The lateral extensions 37 act with the lugs 20 and 22 to engage and position the intermediate member and the outer clutch member.

The intermediate member sits in the channel 24 of the inner clutch member with the lateral extensions 37 extending into the gaps between adjacent lugs of the two sets of lugs. The intermediate member can slide around the inner clutch member for a short distance only before the side wall 38 of the frontmost lateral extension 37 abuts the side wall of its cooperating lug.

In operation, in the overrunning condition of the clutch, the outer clutch member 10 can rotate relative to the inner clutch member 12 in the direction of the arrow 42 (FIG. 2) with the pawl 32 ratcheting over the clutch teeth 18 on the outer clutch member. The intermediate member 14 is held by its own resilience against the inner clutch member 12 with its clutch teeth 26 out of engagement with the clutch teeth 18 of the outer clutch member and the lateral extensions 37 extending into the gaps between the adjacent lugs of the two sets of lugs 20 and 22.

If a driving torque is now applied to the outer clutch member 10 in the direction of the arrow 44 in FIG. 1 via the sprocket teeth 16, the pawl 32 will pick up one of the clutch teeth 18. This causes the intermediate member 14 to begin to move circumferentially around in the inner clutch member until the frontmost lateral extension 37 engages one of the lugs 20 and 22. The intermediate member flexes outward at the front end as the frontmost lateral extension 37 begins to ride up the lug to a position in which the front tooth 26 on the intermediate member engages the corresponding tooth 18 on the outer clutch member. The remaining lateral extensions 37 ride up their cooperating lugs progressively around the intermediate member until the rearmost tooth 26 on the intermediate member is in engagement with its cooperating tooth on the outer clutch member and a fully engaged position is assumed.

Driving torque is therefore transmitted from the outer member to the intermediate member and then to the inner member through the lateral extensions on the intermediate member and the lugs on the inner clutch member.

On cessation of pedalling, the driving torque ceases and the intermediate member is unloaded. The resilience of the intermediate member causes it to contract to its natural position on the inner clutch member, this action being assisted by any drag torque in the reverse direction which assists the clutch teeth in disengaging. Then the pawl 32 ratchets over the clutch teeth on the outer clutch member. Thus, the lateral extensions ride down the lugs 20 and 22 until the inner surface 40 of the extensions again abuts the inner clutch member in between adjacent lugs. As the lateral extensions ride down the lugs, the clutch teeth of the intermediate member start to come out of engagement with the corresponding teeth on the outer clutch member, eventually allowing relative rotation between the two members.

We claim:

1. A one way clutch, comprising coaxial first and second rotatable clutch members and an arcuate resiliently flexible intermediate member arranged between the clutch members, the first clutch member having a set of ratchet teeth and the intermediate member and second clutch member having means for preventing substantial relative rotation between the intermediate and second clutch members, characterized in that the intermediate member has a set of ratchet teeth engageable with the first member ratchet teeth and a set of sloping faced projections at intervals along the intermediate member, in that the intermediate member carries a pawl at one end and in that the second clutch member has a set of sloping faced projections at intervals around the member engageable with those of the intermediate member, the arrangement being such that on relative rotation of the clutch members in a non-driving direction, the pawl ratchets over the ratchet teeth of the first member but on relative rotation in the driving direction, the pawl engages a ratchet tooth of the first member and the projections on the intermediate member abut and ride up the faces of those of the second clutch member to flex the intermediate member towards the first clutch member until the sets of ratchet teeth on the intermediate and first members engage one another to transmit driving torque, said projections on the intermediate member comprising a series of lugs forming lateral extensions of the ratchet teeth on the intermediate member.

2. A one way clutch according to claim 1, wherein the second clutch member has a second set of peripheral projections.

3. A one way clutch according to claim 2, wherein the series of projections on the second clutch member is such that the projections are circumferentially offset with respect to each other by a distance substantially equal to half the circumferential pitch of projections and the lateral extensions of the intermediate member are arranged in a staggered pattern on alternate sides of the member.

4. A one way clutch according to claim 1, wherein all the projections have sloping faces.

5. A one way clutch according to claim 1, wherein at least one of the members is fabricated from plastics material.

6. A ratchet assembly comprising:
   an outer wheel having ratchet teeth on an inner surface;
   an inner wheel coaxial with the outer wheel;
   two rows of radially extending teeth on the other circumference of the inner wheel; and
   a ring disposed between the two rows and having a plurality of spaced-apart, wedge-shaped pawls extending axially from the ring, each pawl between adjacent teeth in a rows of teeth.

* * * * *